United States Patent [19]

Scarpiello

[11] 4,203,911
[45] May 20, 1980

[54] PROCESS FOR CONJUGATING UNCONJUGATED UNSATURATION OF FATTY ACIDS OR ESTERS THEREOF

[75] Inventor: Daniel A. Scarpiello, Parma Heights, Ohio

[73] Assignee: SCM Corporation, New York, N.Y.

[21] Appl. No.: 927,560

[22] Filed: Jul. 24, 1978

[51] Int. Cl.$^2$ .......................... C09F 7/08; C11C 3/14
[52] U.S. Cl. ................................................. 260/405.6
[58] Field of Search ...................................... 260/405.6

[56] References Cited

U.S. PATENT DOCUMENTS

| 2,692,886 | 10/1954 | Blekkingh | 260/405.6 |
| 4,108,879 | 8/1978 | Minowa | 260/405.6 |

*Primary Examiner*—John F. Niebling
*Attorney, Agent, or Firm*—Richard H. Thomas

[57] ABSTRACT

Unconjugated unsaturation of fatty acids or esters thereof are conjugated with sulfided nickel catalysts at elevated temperature and low positive hydrogen pressure.

6 Claims, No Drawings

PROCESS FOR CONJUGATING UNCONJUGATED UNSATURATION OF FATTY ACIDS OR ESTERS THEREOF

BACKGROUND OF THE INVENTION

The present invention relates to conjugating unconjugated unsaturation of lipoidal feedstock and in particular to such process practiced on fatty acids or esters thereof using the sulfided nickel catalyst.

British Pat. No. 646,919 proposes to conjugate unconjugated unsaturation contained in glyceride oils by heating the oils to about 170°–220° C. in the presence of 1 to 5% of sulfided nickel or sulfided cobalt catalyst while bubbling an inert gas such as carbon dioxide through the oil during the process. Similarly, British Pat. No. 693,981 and its corresponding U.S. Pat. No. 2,692,886 propose to conjugate unconjugated fatty acids or esters thereof at a temperature of less than 140° C., advantageously 100°–120° C., in the presence of about 5 to 10% of nickel or cobalt catalyst containing nickel silicate or cobalt silicate and about 1 to 10% sulfur by weight of the nickel or cobalt. This conjugation process also is conducted under an inert gas blanket or in vacuo.

The present invention is directed to the use of a sulfided nickel catalyst to conjugate fatty acids or esters thereof while maintaining a low positive hydrogen pressure in the system.

BROAD STATEMENT OF THE INVENTION

The present invention is an improvement in process for conjugating unconjugated unsaturation of fatty acids or esters thereof by contacting said fatty acids or esters with a sulfided nickel catalyst in an agitated reaction zone. The improvement in process comprises establishing and maintaining in said reaction zone a positive hydrogen pressure of not substantially above about 10 psig, a catalyst concentration of about 0.2 to 3% nickel by weight, and a temperature of between about 200° and 250° C. until substantially maximum conjugation occurs.

DETAILED DESCRIPTION OF THE INVENTION

Although any unconjugated polyunsaturated fatty acid or fatty acid ester can be conjugated according to the present process, the unconjugated unsaturated fatty acids of the most practical interest are linoleic acid and linolenic acid, as these acids can be found in significant amounts in natural glyceride oils and especially in vegetable oils. Conjugated unsaturated fatty acids and esters thereof find utility in the manufacture of alkyd paints, lacquers, varnishes, drying oils and waxes, and the like because of their superior drying properties and good performance which they contribute to such paints.

Prime lipoidal feedstock for the present process comprises glyceride oils which are full fatty acid esters of glycerine. While the present process performs efficiently on lipoidal feedstock containing but a few percent unconjugated polyunsaturation, efficiency and economy are best served with feedstocks containing appreciable content of unconjugated polyunsaturation, for example, from about 30% to about 80% of such unconjugated polyunsaturation. For convenience herein, linoleic acid will be used to refer to those unconjugated unsaturated fatty acids and esters useful in the present process as linoleic acid typically is the most plentiful fatty acid available for use in the present process. Representative oils containing appreciable unconjugated fatty acids for the present process include, for example, the oils; citrus seed such as grape seed, corn, cottonseed, oat, peanut, rice bran, safflower, sesame seed, soybean, sunflower seed, hempseed, wild mustard, poppyseed, rubberseed, sugar cane, black walnut, linseed, dehydrated castor, rapeseed, and some marine (fish) oils.

Other useful lipoidal feedstocks containing appreciable linoleic acid for use in the present process include mixtures of free fatty acids wherein various saturated or mono-unsaturated fatty acids make up the remainder of such free fatty acid mixture, partial fatty acid glycerides, fatty acid esters such as alkyl esters, and the like and mixtures thereof.

The sulfided nickel catalysts for use in the present process are those sulfided nickel catalysts typically used to selectively hydrogenate or elaidinize glyceride oils advantageously in the production of hard butters. The sulfided nickel catalysts can have a sulfur content normally ranging from about 1 to 20% chemically bonded sulfur by weight of the nickel, and preferably from about 5 to 12%. Preparation of sulfided nickel catalysts is well known in the art and many various sulfided nickel catalysts are commercially available.

In practicing the present invention, the unconjugated polyunsaturated lipoidal feedstock is charged into an agitated reaction zone and contacted with the sulfided nickel catalyst. Reaction conditions established and maintained in the reaction zone include a positive hydrogen pressure of not substantially above about 10 psig and preferably between about 2 and about 5 psig, and a temperature of between about 200° and 250° C. The proportion of catalyst ranges from between about 0.2 and about 3% nickel by weight of the feedstock being subjected to the present conjugation process. Agitation established in the reaction zone should be nonturbulent and sufficient only to suspend the required proportion of catalyst in the molten lipoidal feedstock and not substantially more. The process is terminated when it is determined that the maximum degree of conjugation of the feedstock has been reached. Generally, it will take between about 5 and 10 hours in order to achieve such maximum conjugation of the feedstock. Gas chromatography is a convenient and useful method for determining the degree of conjugated unsaturation which the fatty acid or fatty acid ester contains. Monitoring of periodic samples taken during the course of the reaction is a preferred method for following the degree of conjugation achieved during the present process.

The present conjugation process can be performed quite advantageously on a continuous basis as well as a batch basis. A variety of conventional schemes for separation of the catalyst from the conjugated feedstock and other necessary and/or desirable operations are well known in the art, and little need be said about these operations here. The resulting conjugated fatty acid or fatty acid ester withdrawn from the reaction zone, will have an Iodine Value not susbstantially lower than the Iodine Value of the lipoidal feedstock fed to the process (usually about a 10–15 IV drop or less). Such withdrawn conjugated material will contain a substantial amount of conjugated polyunsaturation.

The following example shows in detail how the present invention can be practiced, but they should not be construed as limiting the scope of the present invention. In this specification all percentages and proportions are by weight, all and all temperatures are degrees Centigrade, unless otherwise expressly indicated.

EXAMPLE

A lot of an alkali refined cottonseed oil was subjected to the present process under the following conditions:

REACTOR: 2 liter Parr vessel
LOT SIZE: 1300 grams of cottonseed oil
CATALYST AMOUNT: 0.5 wt-%
CATALYST TYPE: Sulfided Nickel—12% sulfur by weight of nickel, supplied by United Catalyst, Inc., Louisville, Ky. 40232
TEMPERATURE: 225° C.
PRESSURE: 5 psig hydrogen
AGITATION: 150 r.p.m. (fixed bladed stirrer)

The oil and catalyst were charged into the reactor and its contents evacuated of air with a hydrogen purge. The reactor then was heated to reaction temperature under vacuum for one hour. Finally, hydrogen gas was admitted to the reactor at the indicated pressure and samples of the oil periodically removed for monitoring the reaction. The following table displays the results obtained by GLC analyses (gas-liquid chromatography) and IR (infrared) analysis of trans-isomer content.

| FATTY ACID | HYDROGENATION TIME (HRS.) | | | | | |
|---|---|---|---|---|---|---|
| CONTENT (wt-%) | 0 | 1 | 3 | 5 | 7.5 | 10.5 |
| STEARIC | 2.2 | 3.5 | 3.5 | 3.7 | 3.7 | 4.0 |
| OLEIC | 15.9 | 18.0 | 21.0 | 24.2 | 25.9 | 29.2 |
| LINOLEIC | 56.4 | 37.9 | 27.0 | 21.2 | 18.5 | 16.5 |
| CONJUGATED DIENES | — | 15.8 | 23.1 | 24.2 | 25.6 | 22.8 |
| IV (Calculated) | 113.8 | 109.0 | 105.3 | 100.0 | 99.3 | 93.8 |
| TOTAL TRANS ISOMER CONTENT (%) | — | 9.1 | 15.1 | 17.7 | 20.2 | 23.0 |
| CONJUGATION (%) | — | 29.4 | 46.1 | 53.3 | 58.0 | 58.0 |

The above-table results clearly show the excellent degree of conjugation achievable by the instant invention while significantly suppressing hydrogen absorption by the oil.

I claim:

1. In a process for conjugating unconjugated unsaturation in polyunsaturated lipid feedstock by contacting said feedstock with a sulfided nickel catalyst in an agitated reaction zone, the improvement which comprises: establishing and maintaining in said reaction zone a positive hydrogen pressure of not substantially above about 10 psig, a catalyst concentration of about 0.2 to 3% nickel by weight, and a temperature of between about 200° and 250° C. until substantially maximum conjugation of said feedstock occurs.

2. The process of claim 1 wherein said lipid comprises fatty acid or fatty acid ester.

3. The process of claim 2 wherein said lipid comprises a fatty acid ester of glycerine.

4. The process of claim 3 wherein said lipid comprises a triglyceride oil.

5. The process of claim 1 wherein said hydrogen pressure is between about 2 and about 10 psig.

6. The process of claim 1 wherein said sulfided nickel catalyst contains between about 1% and 20% sulfur by weight of said nickel.

* * * * *